United States Patent [19]

Stoll

[11] 4,288,112
[45] Sep. 8, 1981

[54] CONNECTING PIECE FOR SUPPLY LINES CARRYING GASEOUS OR FLUID MEDIA

[76] Inventor: Kurt Stoll, Lenzhalde 72, Esslingen, Fed. Rep. of Germany

[21] Appl. No.: 31,492

[22] Filed: Apr. 19, 1979

[30] Foreign Application Priority Data

May 3, 1978 [DE] Fed. Rep. of Germany ....... 7813457

[51] Int. Cl.³ ............................................. F16L 33/00
[52] U.S. Cl. .................................... 285/238; 285/322; 285/423; 285/DIG. 22
[58] Field of Search ................ 285/DIG. 7, DIG. 22, 285/423, 322, 323, 34, 35, 243, 248, 249, 255, 319, 238, 382

[56] References Cited

U.S. PATENT DOCUMENTS

| 1,760,011 | 5/1930 | Selah | 285/323 |
| 2,327,714 | 8/1943 | Iftiger | 285/35 |
| 3,394,950 | 7/1968 | Jensen | 285/322 X |
| 3,924,881 | 12/1975 | O'Connor | 285/DIG. 22 |
| 4,042,262 | 8/1977 | Mooney et al. | 285/382 |
| 4,103,941 | 8/1978 | Stoll | 285/322 |

FOREIGN PATENT DOCUMENTS

| 2528757 | 1/1977 | Fed. Rep. of Germany | 285/322 |
| 572727 | 2/1924 | France | 285/322 |
| 663237 | 4/1964 | Italy | 285/323 |

Primary Examiner—Dave W. Arola
Attorney, Agent, or Firm—Blanchard, Flynn, Thiel, Boutell & Tanis

[57] ABSTRACT

A connecting piece capable of providing a connection with supply lines carrying a gaseous or fluid media. One end of the connecting piece has a nonsymmetrical connecting member adapted to encircle and embrace the end of a supply line inserted thereinto. The other end of the connecting piece has a threaded member. The two parts are assembled by inserting one into the other. An annular quick release lock consisting of an annular groove in one of the connecting members and a continuous annular projection on the other connecting member enables the two parts to be connected together. A central opening extends through both parts. Additional structure is provided on the parts to provide a visible indication to the user that the two parts are fully connected together.

6 Claims, 1 Drawing Figure

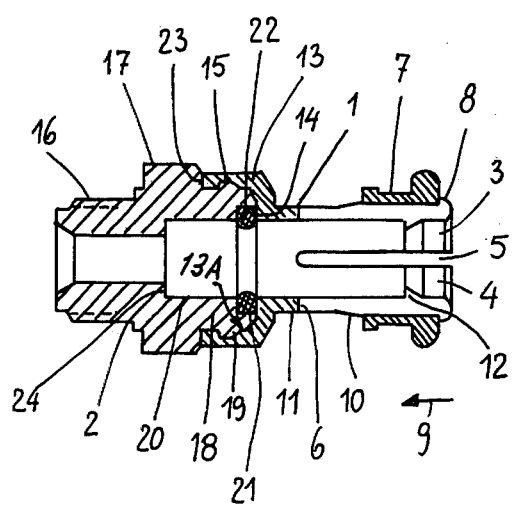

CONNECTING PIECE FOR SUPPLY LINES CARRYING GASEOUS OR FLUID MEDIA

FIELD OF THE INVENTION

This invention relates to a connecting piece capable of providing a connection with supply lines carrying gaseous or fluid media, which comprises on one end a non-symmetrical connecting member designed in the form of, for example, a clamping tool to embrace the end of a supply line inserted into the connecting member, and on the other end, an independent threaded member, the two parts being assembled by insertion of one into the other, and secured by means of an annular quick-release lock consisting of an annular groove in one of the connecting members and a continuous projection on the other connecting member whereby these members, assembled into one connecting piece, provide a continuous passage, both having a central bore.

BACKGROUND OF THE INVENTION

A connecting piece of this kind is described in the DOS No. 25 28 757. The connecting member is inserted into the threaded member whereby an annular groove around the internal circumference of the threaded member corresponds to an annular projection on the external circumference of the connecting member. With this arrangement, the diameter of the quick-release lock is relatively small and the effective axial loading area of the connection between the two surfaces of the groove and projection, is correspondingly small. In consequence thereof are created a number of unfavourable conditions when high axial forces are present or when the media in the supply lines are streaming alternatingly in opposite directions and create pulsating loads. This is especially unfavourable when the two members of the connecting piece are made of a plastics material because the surface pressure may be so high that it resiliently expands the threaded member and elastically compresses the connecting member which is inserted into the latter, at least in the area of the annular lock. This condition may lead to the unintentional release of the lock. In addition to this there is the danger of the annular projection being torn off under shear loads resulting from an excessive surface pressure, especially with connecting pieces assembled from a threaded member made of a plastics material, and a connecting member made of metal.

Another drawback which is due to the relatively small diameter of the annular quick-release connection is explained below: The resilient expansion of the threaded member, and the elastic compression of the connecting member, aggravated by the danger of shearing the projection off, depend substantially on the choice of the materials used with the manufacture of the threaded member. It is easy to see that a threaded member consisting of metal will hardly be resiliently expanded under axial loads. However, the danger of shearing is greater, especially when the adjacent connecting member consists of a plastics material. This danger may be counteracted by a correspondingly resistant profile of the annular projection. This dependency on the structural materials makes it necessary to provide two different connecting members of different dimensions when a connecting piece is used with supply lines having different diameters, to be suitable for the threaded member which may be manufactured of metal or of a plastic material.

It is an object of the present invention to provide a connecting piece of the type referred to above which, in order to avoid the above drawbacks, is designed in such a manner that the danger of excessive axial surface pressure does not occur.

This object is solved by pushing the connecting member over the threaded member whereby the annular projection is loaded on the external circumference of the threaded member, and the annular groove extends around the internal circumference of the connecting member.

With this arrangement the location of the annular quick-release lock has been changed by moving it radially outwardly, in consequence of which the diameters of the annular groove and projection had to be increased. The axial surface pressure between the annular projection and the annular groove is therefore small even with connecting pieces subjected to high tensile loads or passing media under pulsating loads. This reduced surface pressure is too small to lead to a resilient expansion of the connecting member now located on the outside; nor does it suffice for compressing the threaded member on the inside of the assembly. Obviously the pressure is also too small to shear the annular projection off.

BRIEF DESCRIPTION OF THE DRAWING

Below, the invention is explained, reference being made to the only drawing which accompanies the specification. Measures are discussed which may be taken to gain the advantages of the invention. The accompanying FIGURE is a longitudinal section through a connecting piece according to the invention.

DETAILED DESCRIPTION

The connecting piece is composed of two sections, namely the connecting member 1 on one end, and the threaded member 2 on the other end of the assembly. The connecting member 1 is designed in the manner of a clamping tool comprising a number of clamping elements 3, 4 which are equidistantly arranged around the circumference and separated from each other by slots 5. The clamping elements 3, 4 extend from a central circumference 6 in the connecting member in a direction away from the threaded member 2 so that the free ends of the tool elements 3, 4, are remote from the threaded member 2. A clamping ring 7 which is moveable in both axial directions is mounted on the external circumference of the clamping elements 3, 4. In its effective extreme position which is shown in the illustration, the ring presses the clamping tool elements together so that their initially cylindrical form is forced radially inwardly. An annular safety collar 8 at the outer end of the clamping tool prevents the ring 7 from being unintentionally pulled off. When the clamping ring 7 is moved in the direction of the arrow 9 and over a conical section 10 of the connecting member 1 it assumes its ineffective position and the clamping elements 3, 4 may snap elastically radially outwardly provided that the clamping ring 7 is located on the cylindrical, reduced diameter section 11, which means that the opening between the clamping tool elements 3, 4 widens correspondingly. There is moreover an annular, tooth shaped, projection 12 which extends around the internal circumference of the clamping tool elements 3, 4.

On the side adjacent to the threaded member 2, the connecting member 1 comprises an extended diameter section 13 which is adjacent to the cylindrical section 11 having a smaller diameter, and is substantially cylindrical having an axially extending recess 13A facing outwardly in a direction opposite the end containing the clamping tool elements 3, 4, its bottom forming a radially directed step 14. Finally, there is an annular groove which extends along the internal circumference of the recess 13A.

The threaded member 2 which comprises on one side a threaded part 16 to connect for example with a rigid line made of metal moreover comprises, adjacent to the threaded part 16, in the direction towards the connecting member 1, an external operating collar 17, of a polygon shape, such as a hexagonal form which projects radially and may for example be of hexagonal shape so that it can be operated with the aid of a spanner. Adjacent to this operating collar 17 is an sleeve or projection 18 which is of a smaller diameter than the collar 17 and comprises on its external circumference a continuous radially outwardly projecting projection 19 which, like the annular groove 15 is fully annular, its cross-section corresponding to the latter. A recess is cut out of the front surface of the threaded member 2 which is adjacent to the connecting member 1, the cut-out being annular and radially extending towards the central continuous bore 20 which extends through the threaded member and the connecting member, and also being open as at 21 on said front surface so that it may accommodate an O-ring 22 consisting of a sealing material.

The substantially cylindrical wider part 13 of the connecting member 1 is pushed over the annular sleeve 18 of the threaded member 2 whereby the annular projection 19 on the external circumference of the threaded member engages with the corresponding annular groove 15 in the internal circumference of the connecting member, constituting a quick-release lock. In the assembled state, the radially extending step 14 of the connecting member 1, which is formed by the bottom of the wider part 13, rests against the front face of the threaded member 2 so that the O-ring 22 between the two members of the connecting piece is forming a seal. Moreover, with the assembled connecting piece, the free end of the wider part 13 rests against the end face of the operating collar 17 which is adjacent to the connecting member 1, providing a stop for the end of the latter which was pushed over the other member. Finally it may be pointed out when describing the physical features of the connecting piece that the collar 17 on the threaded member is axially spaced from the front face of the latter which is adjacent to the connecting member 1 and also relative to the O-ring 22.

Summarising, a connecting piece comprises on its threaded member 2 at a given spacing from its front face inserted into the connecting member 1 a radially projecting operating collar 17 which may for example be of hexagonal form, and adjacent to it an annular sleeve 18 which is recessed relative to the operating collar 17, and inserted into the connecting member 1, and comprises on its external circumference an annular projection 19 and on its internal circumference, in the region of the front face of the threaded member 2, a recess 21 which extends towards the central continuous bore 20 and is open on said front face. The end of the connecting member 1 which is adjacent to the threaded member 2 comprises a substantially cylindrical, extended diameter, section 13 which embraces the annular extension 18, its free end butting against the collar 17 and one of its radial steps 14 which constitutes the bottom resting against the end face of the threaded member 2, an annular groove 15 whose cross-section corresponds to the continuous projection 19 on the annular projection 18 at the internal circumference of the wider part 13.

For the sake of completeness it is mentioned that the process of assembling begins with withdrawing the clamping ring 7 from its effective position into its ineffective position, so that the end of the supply line may be inserted into the connecting piece 1 until it butts against a central step 24 in the continuous bore 20 in the threaded member 2, followed by pushing the clamping ring 7 back into its effective position. Since the radial dimension of the circular step 24 corresponds to the wall thickness of the supply line the through-flow cross-section is constant throughout its entire length.

It follows from the above that the annular groove 15 and the annular projection 19 are located relatively near to the outer surface of the assembly which means that the diameter of this quick-release lock is great. In this manner it has been achieved that the contact area between the annular groove and projection is correspondingly large in the axial direction. In other words, a large surface is available for the absorption of axial forces created for example by mechanical tensile forces or by pulsating loads in the supply lines, so that the corresponding surface pressure in the quick-release lock is too small to widen elastically the wider part 13. The surface pressure in the connection is also too small to shear the annular projection 19 off even in the case of threaded members 2 consisting of a plastics material.

Whereas the connecting piece described in the German DOS No. 25 28 757 comprises an O-ring which is more centrally located inside the threaded member, and the connecting member inserted into the threaded member extends to the O-ring, the assembly according to the invention is different and offers thereby the following advantages over the above.

In the assembled state, the connecting piece 1 rests against the operating collar 17. It is therefore easy when mounting the parts to externally ascertain that the two connecting members of the connection are correctly joined to each other and thus to avoid pushing the connecting piece too far or not far enough.

Plastic connecting pieces are preferably manufactured by injection moulding because in this case the annular groove 15 is formed with the aid of a collapsible core, the latter being a form core the cross-section of which may be reduced in a tapering manner to facilitate the removal of the product. Although the moulding process with a collapsing core entails the drawback of a longitudinal seam extending over the internal circumference of the wider part 13 this will not interfere at all with operations. The comparable longitudinal seam developed in the case of the connecting piece according to the DOS NO. 25 28 757, however, which is located on the internal circumference of the threaded connecting member extends up to the region of the O-ring and this may adversely affect the tightness of the assembly.

With hexagonal operating collars 17 the wall thickness of the threaded connecting member cannot be constant in the region of the collar. When the collar is made of a plastics material the theoretically circular bore is bound to become slightly untrue because of the non-uniform shrinkage of the synthetic material while it solidifies at positions varying in thickness. This slight distortion of the continuous bore in the region of the operating collar decreases in the case of the present invention towards the O-ring 22, bearing in mind that the recess 21 for its accommodation was cut out at a given distance from the operating collar 17. The recess 21 is therefore truly circular and the effect described above does not affect the sealing quality. In contrast, the operating collar and the O-ring used with the assembly according to the DOS No. 25 28 757 are located in the same plane and it may therefore easily happen that the sealing seat is out of circularity.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A connecting piece for supply lines carrying gaseous or fluid media, comprising:

a first elongated and hollow connecting member having a first central body segment with an enlarged end structure on one end terminating in a first axially facing surface which has a first axially facing recess therein communicating with the interior of said hollow connecting member and opening in a direction remote from said first central body segment, the bottom of said first recess defining a second axially facing surface extending parallel to said first surface, said first recess having an annular recess on the internal surface thereof intermediate said first and second surfaces, a supply line clamping means connected to said first central body segment on an end thereof remote from said enlarged end structure;

a second elongated and hollow connecting member having a second central body segment with an end segment extending axially away from said second central body segment and a sleeve segment extending axially away from said second central body segment on a side thereof opposite said end segment, said sleeve segment having a cross-sectional size less than the cross-sectional size of said second central body segment to thereby define a third axially facing surface facing in a direction toward said first surface on said first connecting member, said sleeve terminating in a fourth axially facing surface parallel to said third surface, said fourth surface having a second axially facing recess therein communicating with the interior of said second connecting member, the bottom of said second recess defining a fifth axially facing surface extending parallel to said third and fourth surfaces, the axial spacing between said third and fourth surfaces on said second connecting member being equal to the axial spacing between said first and second surfaces on said first connecting member, said sleeve segment having an annular projection on the external surface thereof intermediate said third and fourth surfaces;

said sleeve segment being received in said first recess with said third surface thereof engaging said first surface and with said fourth surface engaging said second surface, a compressible seal member received in said second recess and being compressed between said second and fifth surfaces, said annular projection being operatively received in said annular recess to hold said first and second connecting members in a coupled relationship and said first and third surfaces as well as said second and fourth surfaces in engagement with each other.

2. The connecting piece according to claim 1, wherein said hollow interior of said second connecting member has means defining a sixth axially facing surface parallel to and facing in the same direction as said fifth surface, said sixth surface being located intermediate said fifth surface and the terminal end of said end segment.

3. The connecting piece according to claim 1, wherein said end segment has fastening means thereon.

4. The connecting piece according to claim 3, wherein said fastening means is an external thread.

5. The connecting piece according to claim 1, wherein said second central body segment is an operating collar having a polygon cross-sectional shape.

6. The connecting piece according to claim 1, wherein the material of said second connecting member externally of said second recess is of a uniform cross section.

* * * * *